(12) United States Patent
Eberhardt

(10) Patent No.: US 7,987,655 B2
(45) Date of Patent: Aug. 2, 2011

(54) TUBULAR BAGGING MACHINE AND METHOD

(75) Inventor: Erich Eberhardt, Grayson, GA (US)

(73) Assignee: Rovema Packaging Machines, LP, Lawrenceville, GA (US)

( * ) Notice: Subject to any disclaimer, the term of this patent is extended or adjusted under 35 U.S.C. 154(b) by 184 days.

(21) Appl. No.: 12/428,092

(22) Filed: Apr. 22, 2009

(65) Prior Publication Data

US 2009/0263050 A1  Oct. 22, 2009

Related U.S. Application Data

(60) Provisional application No. 61/046,889, filed on Apr. 22, 2008.

(51) Int. Cl.
*B65B 9/06* (2006.01)
(52) U.S. Cl. ............... 53/552; 53/451; 53/551; 383/205
(58) Field of Classification Search .................... 53/451, 53/551, 552, 548; 383/205
See application file for complete search history.

(56) References Cited

U.S. PATENT DOCUMENTS

| | | | | |
|---|---|---|---|---|
| 3,184,121 A | * | 5/1965 | Volckening | 222/213 |
| 3,577,700 A | * | 5/1971 | Bippus et al. | 53/453 |
| 3,874,143 A | * | 4/1975 | Braber | 53/412 |
| 4,364,220 A | * | 12/1982 | Rausing | 53/411 |
| 4,964,515 A | * | 10/1990 | Heyden | 383/210 |
| 5,067,306 A | * | 11/1991 | Umezawa | 53/412 |
| 6,085,490 A | * | 7/2000 | Buchko | 53/411 |
| 6,282,870 B1 | * | 9/2001 | Robache | 53/453 |
| 6,615,567 B2 | | 9/2003 | Kuhn et al. | |
| 6,679,031 B2 | * | 1/2004 | Tampieri | 53/453 |
| 6,729,112 B2 | | 5/2004 | Kuss et al. | |
| 7,028,451 B2 | | 4/2006 | Braun et al. | |
| 7,069,707 B2 | | 7/2006 | Braun et al. | |
| 7,175,581 B2 | * | 2/2007 | Murray | 493/186 |
| 2006/0201111 A1 | * | 9/2006 | Tankersley | 53/411 |

* cited by examiner

*Primary Examiner* — Thanh Truong
(74) *Attorney, Agent, or Firm* — Gardner Groff Greenwald & Villanueva

(57) ABSTRACT

A tubular bagging machine includes an innovative indentation-forming device and a modified cross-sealing device. The innovative indentation-forming device includes two punches that form two indentations in the foil web. The machine then forms the foil web into a foil tube with the indentations aligned directly opposite each other and bowed outward. The cross-sealing device includes two opposing sealing jaws each having a blank formed in it. The jaws are closed together to form transverse seal zones in the foil tube. The blanks are aligned with each other and receive the aligned indentations so that they are not sealed together, resulting in the formation of an air bubble in one of the seal zones. Also disclosed are methods of manufacturing the bags, bags produced by the disclosed machines and methods, and retrofit kits for upgrading existing tubular bagging machines.

23 Claims, 10 Drawing Sheets

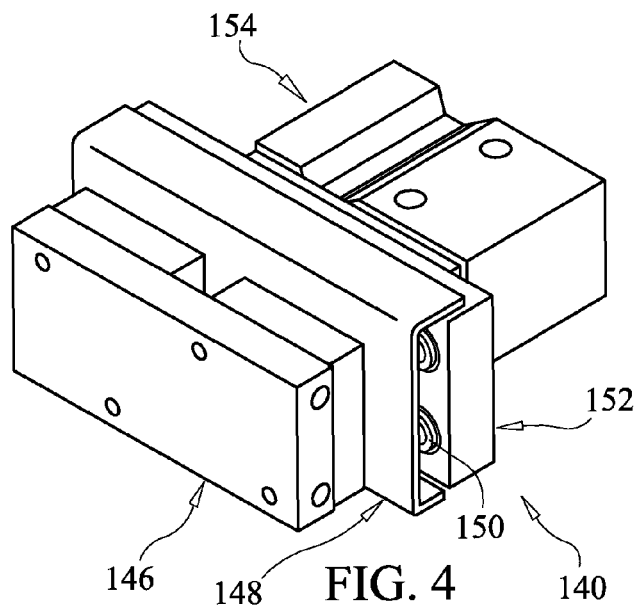
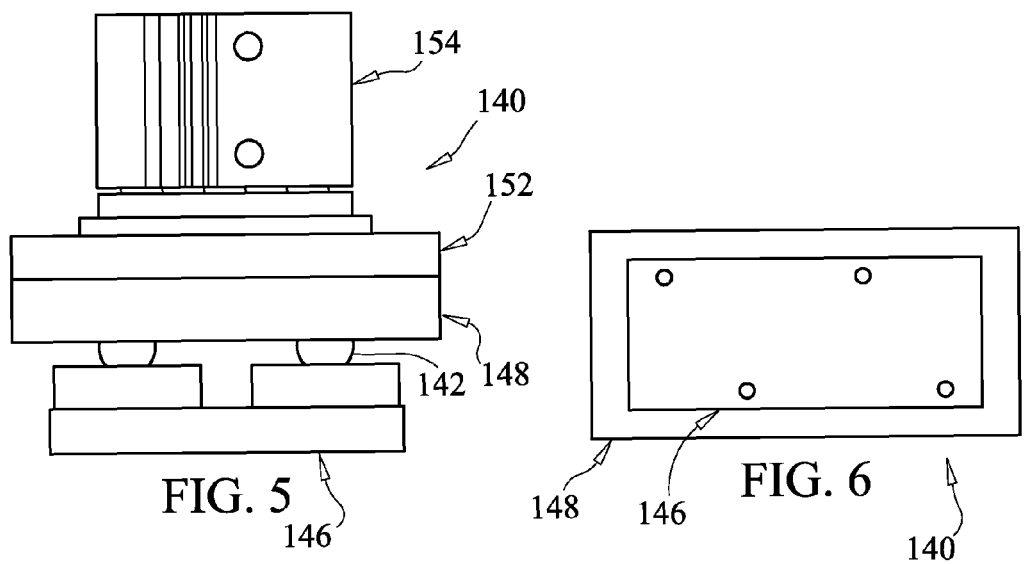

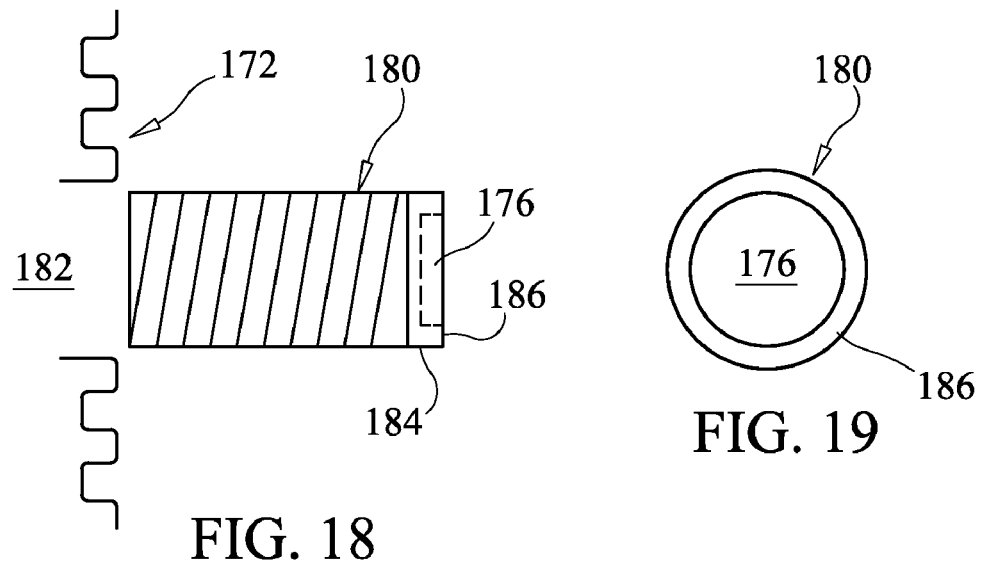
FIG. 18
FIG. 19
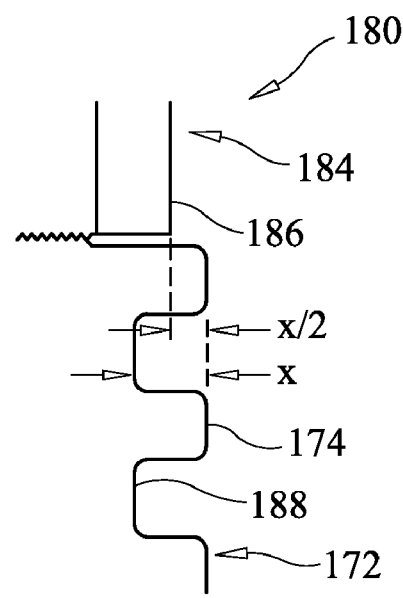
FIG. 20

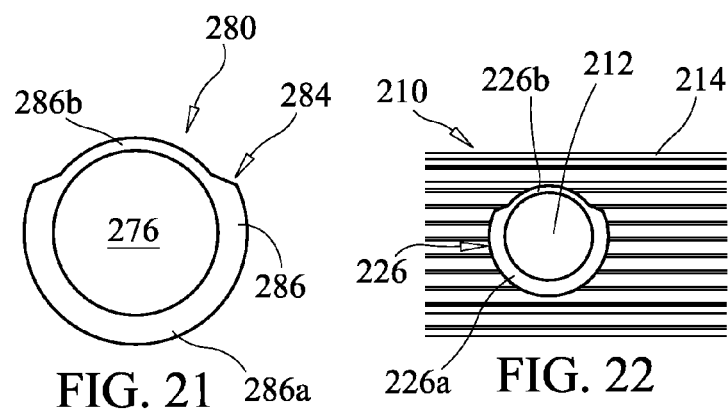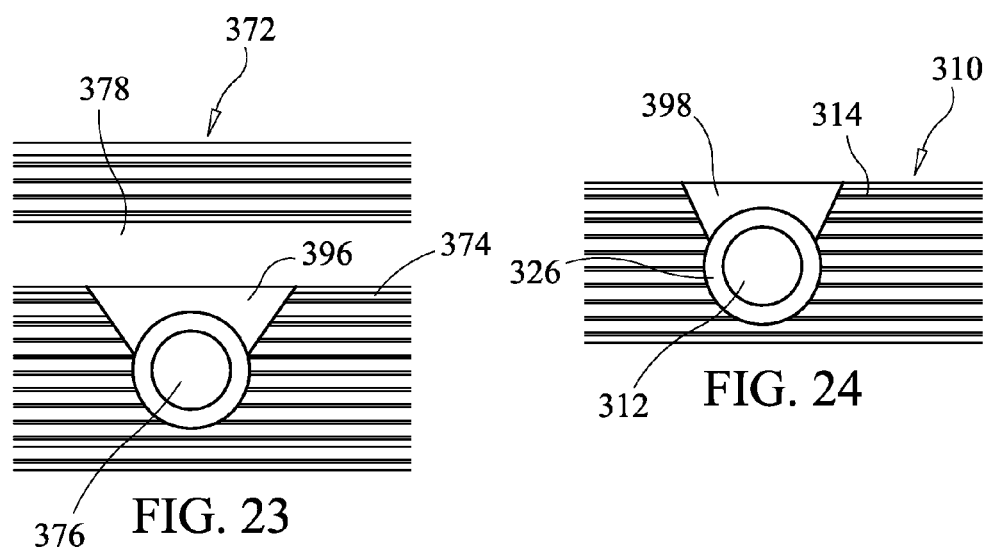

TUBULAR BAGGING MACHINE AND METHOD

CROSS-REFERENCE TO RELATED APPLICATION

This application claims the priority benefit of U.S. Provisional Patent Application Ser. No. 60/046,889, filed Apr. 22, 2008, the entire scope and content of which is hereby incorporated herein by reference.

TECHNICAL FIELD

The present invention relates generally to manufacturing packages for objects such as food, and, in particular, to machines and methods for manufacturing sealed plastic pop-to-open packaging.

BACKGROUND OF THE INVENTION

Many food products such as cheese, coffee, etc. are packaged in sealed plastic bags to retain the food's freshness. But conventional plastic packaging for food can be difficult to open. For example, many bags have top and bottom heat-pressed peelable seal zones, and to open the package the user must pull apart the sides of the bag to peel open the seal. That can be rather difficult and frustrating, particularly for elderly and very young persons who may not have strong fingers.

To remedy this problem, there has been developed an improved food package with a bubble formed in the top seal zone. The user compresses the bubble between his or her fingers and the pressure of the air on the seal zone causes the seal zone to fail. Bursting the bubble forcibly expels the air in the bubble outwardly through the top seal zone at the failure site and out of the top of the bag. Then the top free edges of the bag, which were separated from each other by the bursting bubble, can be gripped to pull the sides of the bag apart to open the bag. Thus, this pop-to-open bag is easier to open that conventional packaging.

However, this type of bag must be carefully and precisely made so that the bubble bursts reliably and properly to allow for the desired ease of opening. To date, this type of bag has only been known to be manufactured with the bubble formed by hand in the seal zone. This adds significantly to the cost and makes this type of bag too expensive for widespread use.

Accordingly, it can be seen that needs exist for improved machines and methods for manufacturing sealed plastic packages. In particular, there is a need for machines and methods for cost-effectively and reliably manufacturing pop-to-open packages that open easily and reliably. It is to the provision of solutions meeting these and other needs that the present invention is primarily directed.

SUMMARY OF THE INVENTION

Generally described, in one aspect the present invention provides machines for cost-effectively and reliably manufacturing pop-to-open bags. In example embodiments, the machines are provided by conventional tubular bagging machines adapted with an innovative indentation-forming device and a modified cross-sealing device. In these embodiments, the machine includes conventional parts of tubular bagging machines such as a storage roll for the foil web, a foil-moving device that transports the foil through the machine, a shoulder for reshaping the foil web into a foil tube, a longitudinal sealing device for sealing the reshaped foil web into the foil tube, a vertical fill tube for filling a section of the foil tube with food or other product, and a separating device for separating newly formed bags from the foil tube. Other types of bag-making machines can be adapted for making the pop-to-open bags as described herein.

The innovative indentation-forming device includes two (or another number of) punches that cooperate with one (or more than one) back plate (e.g., with recesses) to form two (or more) indentations in the foil web. The punches move from a retracted position to an extended position where they contact and deform the foil web to form the indentations. A spring-biased press plate may be included for holding the foil web against the back plate when the punch forms the indentations. Actuators such as reciprocating cylinders may be provided for moving the punches from the retracted position to the extended position. In addition, the punches and the back plate may include heating elements for heating the foil web so the indentations better retain their shape.

The shoulder forms the foil web into a foil tube with the indentations aligned directly opposite each other and bowed outward. The cross-sealing device includes two opposing sealing jaws each having one (of more than one) blank formed in it. The jaws are closed together to form transverse seal zones in the foil tube. The blanks are aligned with each other and receive the aligned indentations so that they are not sealed together, resulting in the formation of an air bubble in one of the seal zones. The jaws may have two contact surfaces for simultaneously forming two seal zones in the bags, one at the bottom and one (with the bubble) at the top. In addition, the jaws may include multiple heating elements for heating one portion of the bubble-containing seal zone with less heat, and thereby forming a weaker seal, relative to another portion of the bubble-containing seal zone, so that the weaker portion fails outwardly first to facilitate more easily opening the bag.

The jaws may also include peripheral (e.g., ring-shaped) contact surfaces surrounding the blanks for forming peripheral seals surrounding the bubbles in the bags. The peripheral contact surface may be transversely inset from the rest of the jaw contact surface. In some embodiments, the peripheral contact surface includes a narrower segment for forming narrower (i.e., weaker) segment of the peripheral seal, so that the weaker segment fails outwardly first to facilitate more easily opening the bag. And in some other embodiments, the peripheral contact surface has a directional channel extending from it for forming an unsealed air-directing area in the seal zone adjacent the bubble, so the bubble tends to burst outwardly to facilitate more easily opening the bag.

In another aspect the present invention provides methods for cost-effectively and reliably manufacturing making pop-to-open bags. For example, such methods may include feeding foil web to a bag-making machine, deforming the foil with at least one punch to form two indentations in the foil web, forming the foil web into a foil tube with the two indentations aligned with each other, transversely sealing the foil tube with two opposing sealing jaws having aligned blanks to form a transverse seal zone with the aligned indentations received in the aligned blanks and cooperatively defining a bubble in the transverse seal zone, and separating sealed sections of the foil tube into the pop-to-open bags. The machine can be provided by for example a conventional tubular bagging machine adapted as described herein.

In another aspect the present invention provides pop-to-open bags made using the machines and methods described herein. And in yet another aspect the present invention provides retrofit kits for upgrading existing conventional tubular bagging machines to make pop-to-open bags. In example embodiments the retrofit kits include indentation-forming devices and cross-sealing devices such as those described herein.

The specific techniques and structures employed by the invention to improve over the drawbacks of the prior machines and methods and accomplish the advantages described herein will become apparent from the following detailed description of example embodiments of the invention and the appended drawings and claims.

BRIEF DESCRIPTION OF THE DRAWINGS

FIG. 4 is a perspective view of an indentation-forming device of the tubular bagging machine of FIG. 3.

FIG. 5 is a plan view of the indentation-forming device of FIG. 4.

FIG. 6 is a left side view of the indentation-forming device of FIG. 4.

FIG. 18 is a left side view of a portion of the sealing jaw of FIG. 13, showing an axially adjustable bushing forming a blank in the sealing jaw.

FIG. 19 is a right side view of the bushing of FIG. 18.

FIG. 20 shows a portion of the sealing jaw and bushing of FIG. 18 with a collar of the bushing positioned inset relative to a contact surface of the welding jaw.

FIG. 21 is a right side view of a blank-forming bushing of a sealing jaw of a cross-sealing device according to another example embodiment of the present invention.

FIG. 22 is a portion of a bag made using the bushing of FIG. 21.

FIG. 23 is a right side view of a portion of a sealing jaw of a cross-sealing device according to another example embodiment of the present invention.

FIG. 24 is a portion of a bag made using the sealing jaw of FIG. 23.

DETAILED DESCRIPTION OF EXAMPLE EMBODIMENTS OF THE INVENTION

In one aspect, the present invention includes improved tubular bagging machines and methods for making pop-to-open bags. The machines may be similar to conventional tubular bagging machines except with additions or modifications for forming at least one bubble in at least one seal zone of bags. Example conventional tubular bagging machines that may be so adapted are shown and described in U.S. Pat. Nos. 7,069,707; 7,028,451; 6,729,112; and 6,615,567, which are hereby incorporated herein by reference in their entireties. Alternatively, the machine may have components different from these conventional tubular bagging machines, as long as they operate to form a foil web into a sealed tube with an open end and, after the seal zone with the bubble is formed to seal the open end and form a bag, separate the bag from the tube.

To form the bubble in the seal zone, the machine is provided with an innovative indentation-forming device and a modified cross-sealing device. The indentation-forming device includes two punches that form two indentations in plastic film that is fed to the machine. And the cross-sealing device includes two oppositely facing sealing jaws each having a blank positioned to receive, after the film is formed into a tube with the two indentations aligned, the aligned indentations therein. The jaws cooperate to form a portion of the tube into a seal zone, with the aligned indentations, which are not sealed together because they are received in the blanks, forming a bubble in the seal zone.

Figure 1:
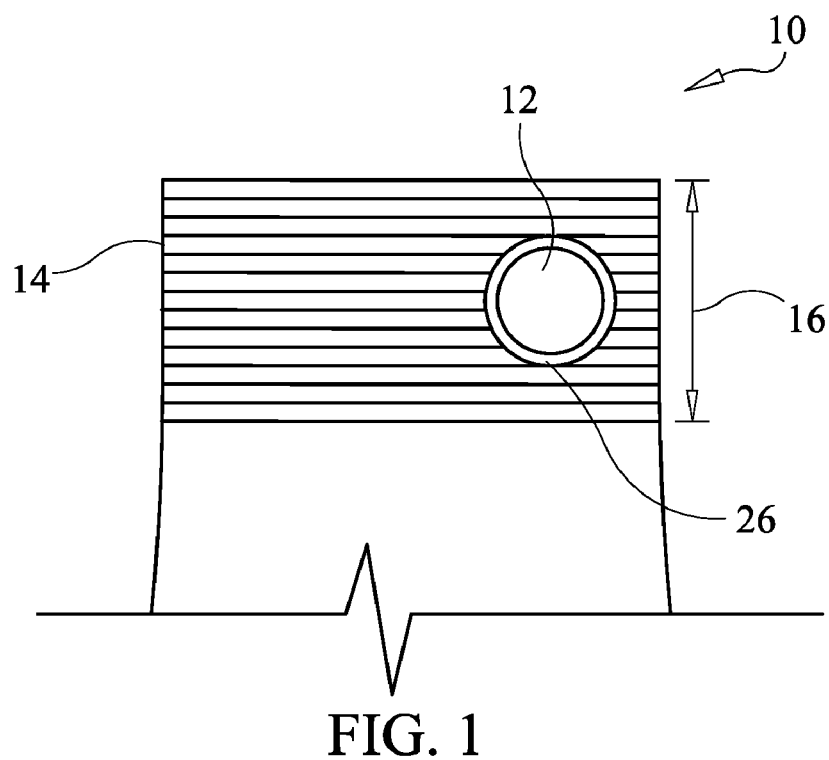
FIG. 1 is a front view of an upper portion of a pop-to-open bag according to an example embodiment of the present invention, showing the bag in a closed/sealed position with an intact top seal zone.
Figure 2:
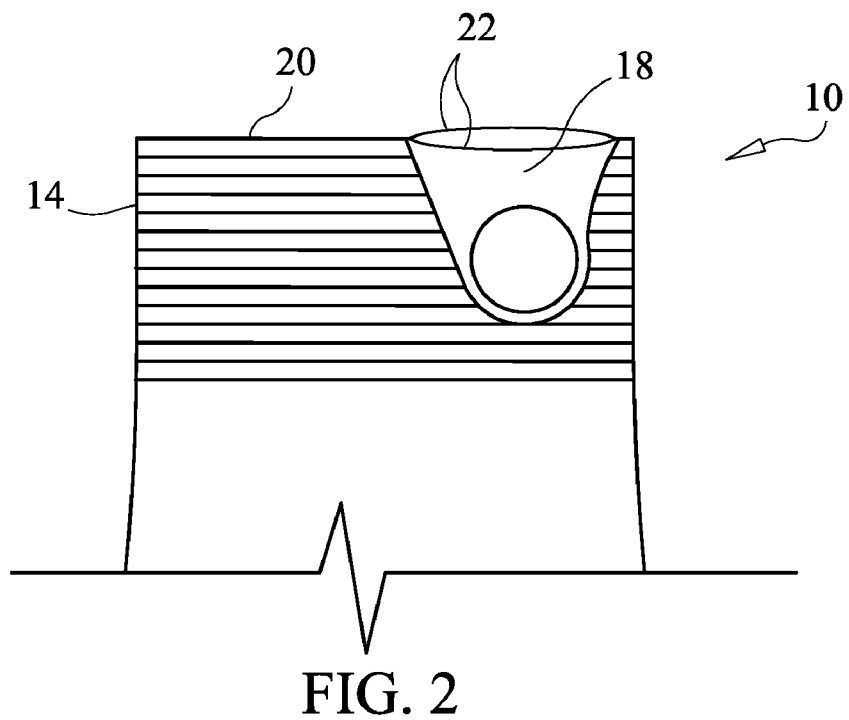
FIG. 2 is a front view of the pop-to-open bag upper portion of FIG. 1, showing a bubble in the top seal zone that has been burst through the top edge of the bag to permit easy opening of the bag.

In another aspect, the present invention includes a pop-to-open bag formed by a machine and/or method described herein. As used herein, the term "bag" is used broadly to mean any sealed package for food or other items. FIGS. 1 and 2 show a pop-to-open bag 10 according to an example embodiment of the present invention. The bag 10 has a bubble 12 formed in a peelable seal zone 14, for example, in the top seal zone as shown in FIG. 1. The bubble 12 contains a fluid such as air, though the bubble can be formed containing another fluid such as a colored gas to show that the seal zone is intact. The shape of the bubble 12 may be other than circular, for example, it may be oval-shaped or have another regular or irregular shape. The size of the bubble 12, relative to the height 16 of the seal zone 14, may be larger or smaller than that depicted. And the height of the seal zone 14 may be larger or smaller than that depicted, depending on the application. Of course, the bags can be made, and the machines and methods for manufacturing them adapted, for forming an outwardly (through a seal zone and toward an edge of the bag) bursting bubble in a seal zone at a side or the bottom of the bags.

To open the bag 10, the user compresses the bubble 12 for example between his or her fingers, and the resulting increased pressure of the air on the seal zone 14 causes the seal zone to fail at a failure zone 18, as shown in FIG. 2. Thus, the bubble 12 bursts by forcibly expelling the air in the bubble 12 outwardly (toward an outer edge of the bag) through the failure zone 18 in the top seal zone 14 and out of the top 20 of the bag 10. Then the top free edges 22 of the bag, which were separated from each other by the bursting bubble 12, can be gripped to pull the sides of the bag apart to peel open the rest of the seal zone 14 and thereby open the bag 10. Thus, this pop-to-open bag 10 is easier to open than conventional packaging without the bubble 12 in the seal zone 14.

Figure 3:
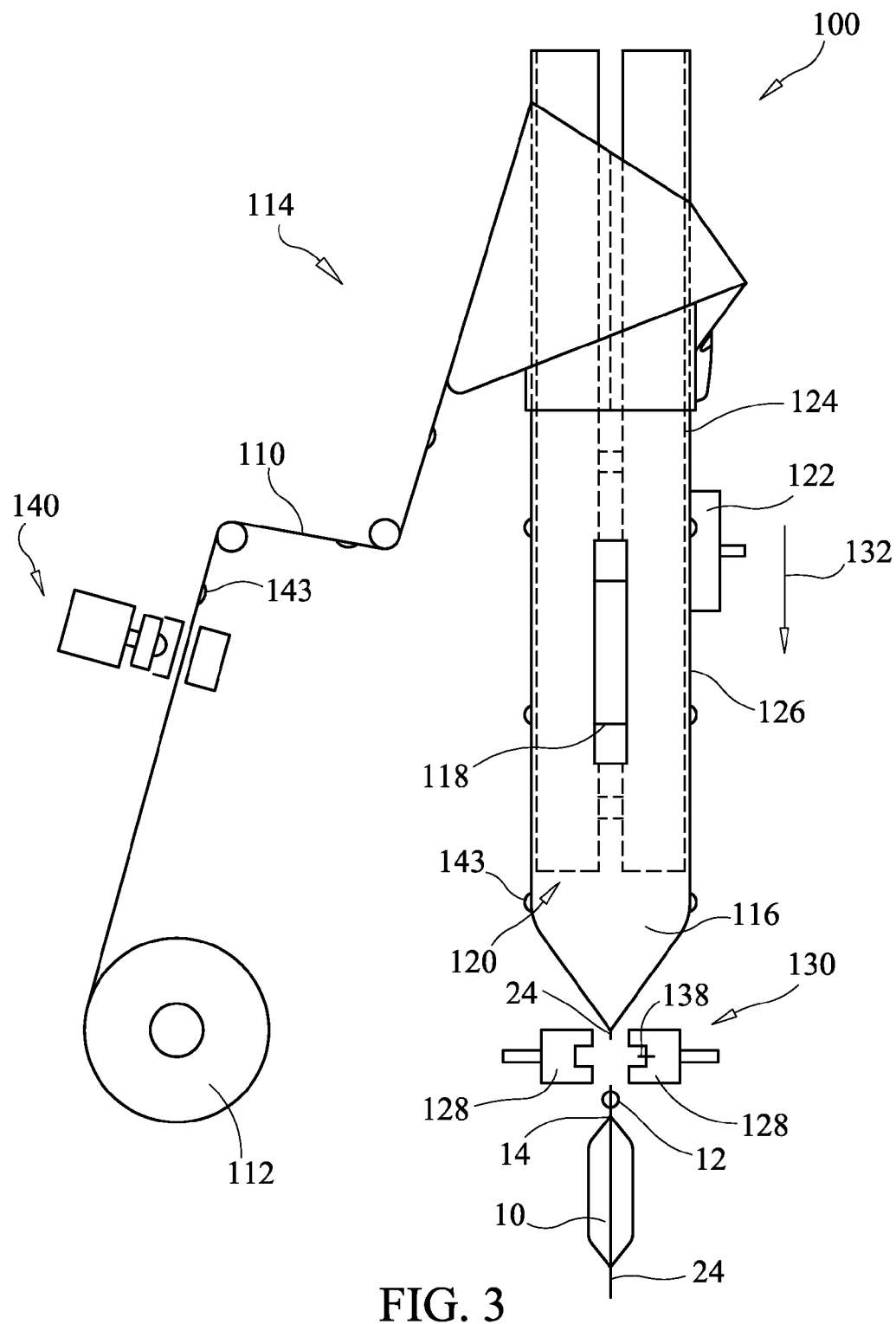
FIG. 3 is a side view of a tubular bagging machine according to an example embodiment of the present invention, showing the machine in use making pop-to-open bags of the type shown in FIG. 1.

Additional details of the tubular bagging machine will now be described. FIG. 3 shows a tubular bagging machine 100 according to an example embodiment of the present invention. A foil web 110 (e.g., a sheet of film made of plastic or another deformable material) is unwound (or otherwise fed) from a storage supply such as a storage roll 112. A forming shoulder 114 reshapes the foil web 110 into a foil tube 116. A foil-moving device 118 (e.g., with foil-engaging rollers driven by a motor) transports the foil web 110 and the foil tube 116 through the machine 100. A fill pipe 120 (e.g., vertically aligned with and at least partially received within the foil tube 116) delivers food or another item into the foil tube. A longitudinal sealing device 122 fastens together (e.g., welds) the longitudinal edges 124 of the foil web 110 and thus creates a longitudinal sealing seam 126 of the foil tube 116. A cross-sealing device 130 with cooperating jaws 128, which can be moved against one another to fasten (e.g., weld) the foil tube 116 transversely with respect to its transport direction 132, creates top seams 14 and bottom seams 24 on the foil tube 116 to form the tubular bags 10 each with an interior space (which is a separate element from the bubble 12 at least before opening the bag) filled with the food or another item. A separating device 138 (e.g., a knife blade) separates the tubular bag 10 from the foil tube 116. These components are typical of conventional vertical tubular bagging machines.

In addition, the machine 100 includes a novel indentation-forming device 140, and the cross-sealing device 130 is modified for this application. Details of the indentation-forming device 140 are shown in FIGS. 4-12, and details of the cross-sealing device 130 are shown in FIGS. 13-20.

Referring additionally to FIGS. 4-12, the indentation-forming device 140 includes one or more punches 142 that move from a retracted position (see FIG. 9) to an extended position (see FIG. 10) to form at least two indentations 143 in the foil web 110. The two indentations 143 are laterally spaced-apart from each other so that, when the foil web 110 is formed into the foil tube 116, the two indentations are aligned directly facing each other. The two indentations 143 are aligned directly facing each other so that they can later be formed into the bubble 12.

In the depicted embodiment for forming bags 10 with one bubble 12, the indentation-forming device 140 has two punches 142 that are laterally spaced apart to form two indentations 143. In an alternative embodiment for forming bags with two bubbles, the indentation-forming device has four punches that form four indentations so that, when the foil web is formed into the foil tube, two of the indentations are aligned directly facing the other two indentations. Thus, it can be seen that to make a bag with a predetermined number "X" of bubbles in the seal zone, a number "2X" of indentations are formed in the foil web. In another alternative embodiment, the indentation-forming device includes only one punch that, after forming a first indentation in the foil web while the punch is in a first position, moves laterally relative to the foil web to a second position where it forms a second indentation in the foil web. In such a single-punch alternative embodiment, the punch may move laterally between the first and second positions along a transverse guide track with the movement controlled by conventional automatic controls. In another alternative embodiment, the indentation-forming device has one punch with two foil-contacting portions that form two indentations.

In addition, the punches 142 may be collectively laterally adjustable to multiple positions so that the indentations 143 can be formed the same lateral distance from the side edge of the bags 10 when using a different-width foil web 110 to produce different-sized bags. Alternatively, the punches 142 may be individually laterally adjustable to multiple positions so that the indentations 143 can be formed a different distance from the side edge of the bags 10 when using a different-width foil web 110 to produce different-sized bags. For example, the indentation-forming device 140, or the punches 142 individually, can be mounted to the machine 100 by conventional mounting structures such as clamps that couple to rods, bars, or other structural members extending transversely across the machine between frame members of the machine.

The punches 142 are provided by rigid members that are made of metal (e.g., steel) or another material with sufficient hardness for forming the indentations 143 in the foil web 110, and that have a foil-contacting portion 144 for forming the indentations in the desired size and shape. Circular indentations having the approximate diameter of a U.S. dime coin have been found to be effective, thought larger or smaller sizes can be used with good results. Larger indentations may result in the use or more foil web 110 per bag and smaller indentations may result in bubbles 12 containing less air which tends to make them not be as easy to burst. Persons skilled in the art will understand that the punches 142 may be provided in other sizes, shapes, and materials, as may be desired in a given application.

Figure 9:
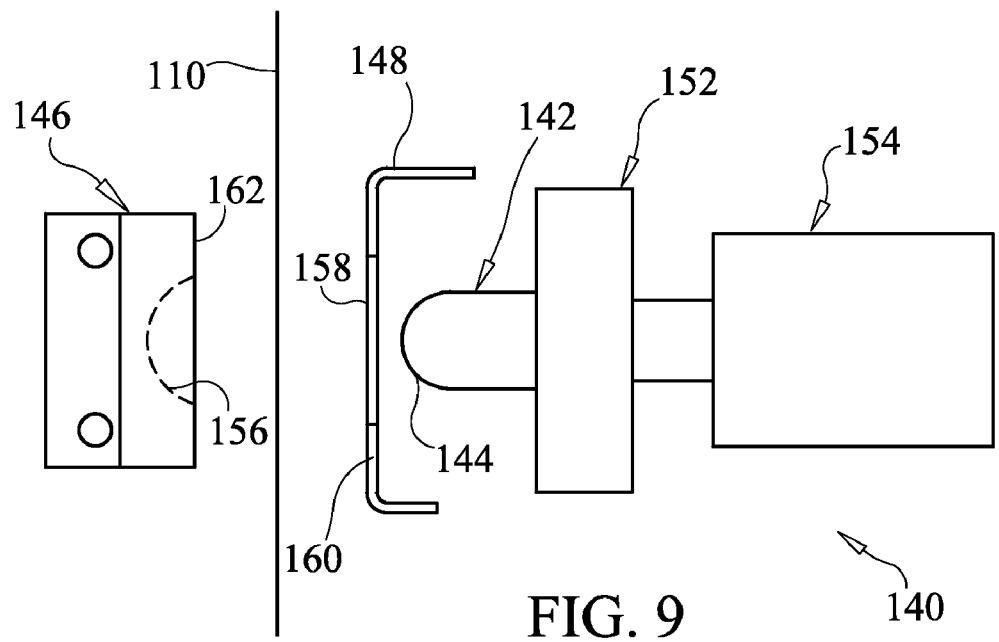
FIG. 9 is a right side view of the indentation-forming device of FIG. 4, showing a punch in a retracted position relative to a back plate.
Figure 10:
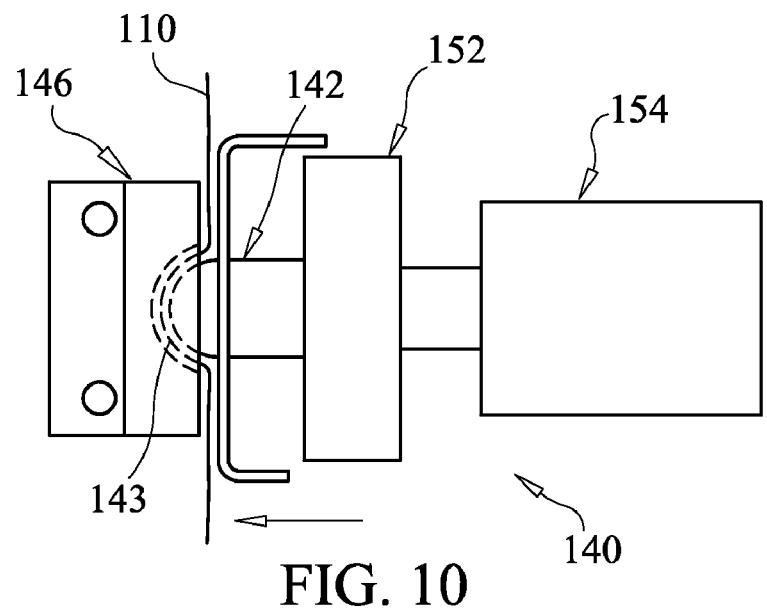
FIG. 10 shows the indentation-forming device of FIG. 9 with the punch in an extended position relative to the back plate.
Figure 11:
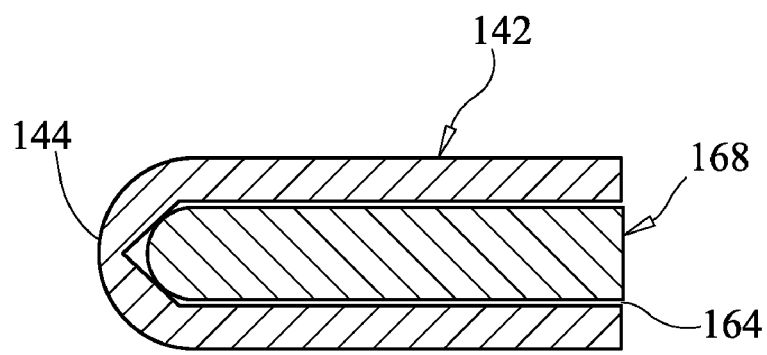
FIG. 11 is a longitudinal cross-sectional view of the punch of FIG. 9 with an internal heating element.
Figure 12:
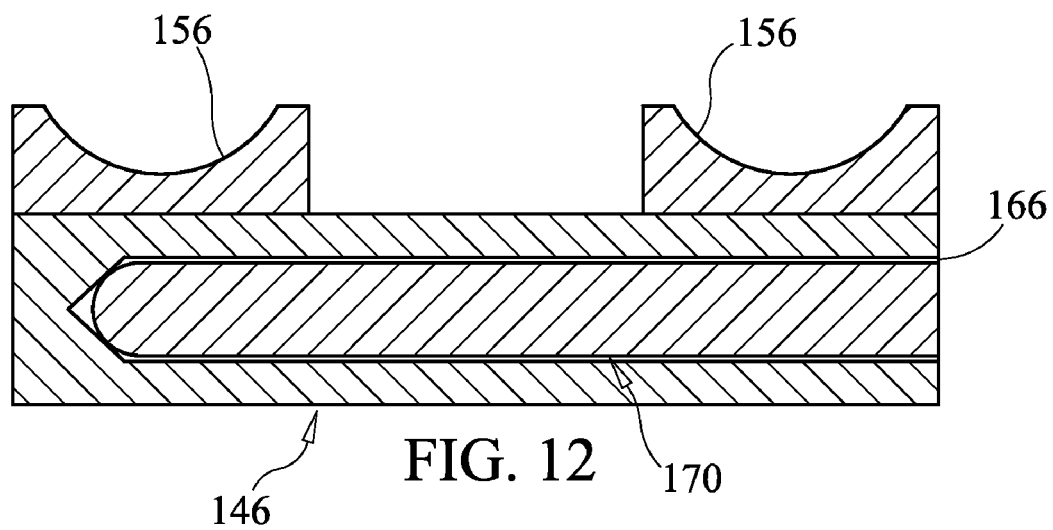
FIG. 12 is a cross-sectional view taken at line 12-12 of the back plate of FIG. 7 with an internal heating element.
Figure 13:
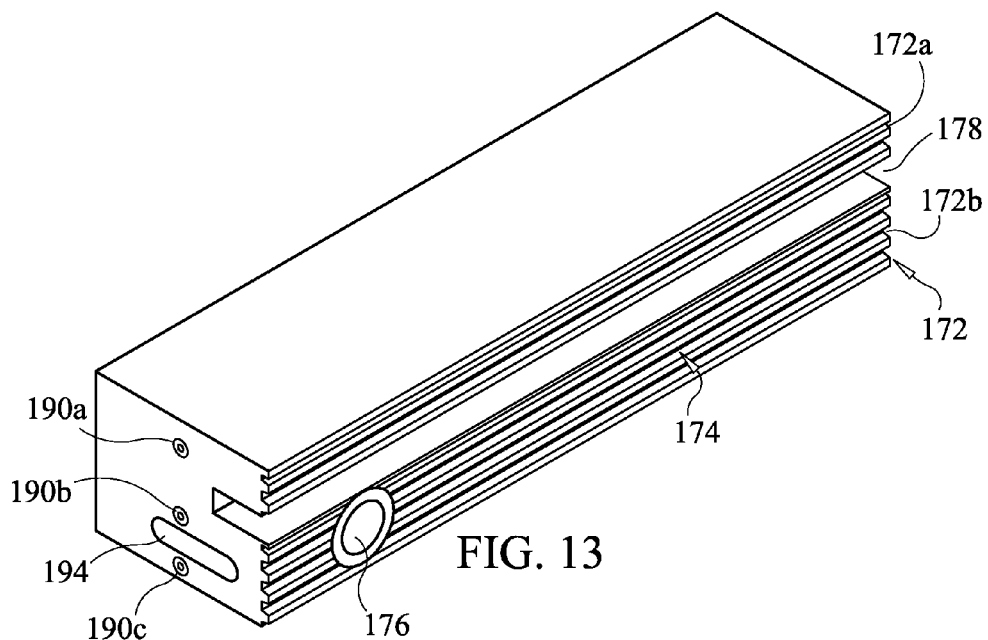
FIG. 13 is a perspective view of a sealing jaw of a cross-sealing device of the tubular bagging machine of FIG. 3.
Figure 14:
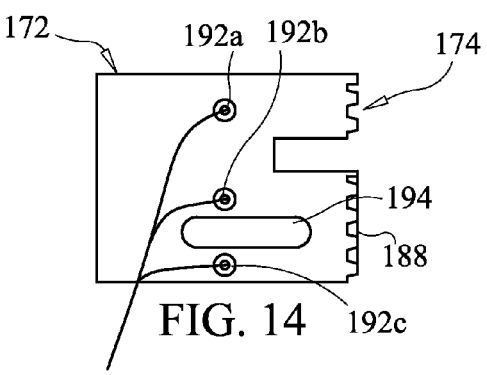
FIG. 14 is a left side view of the sealing jaw of FIG. 13.
Figure 15:
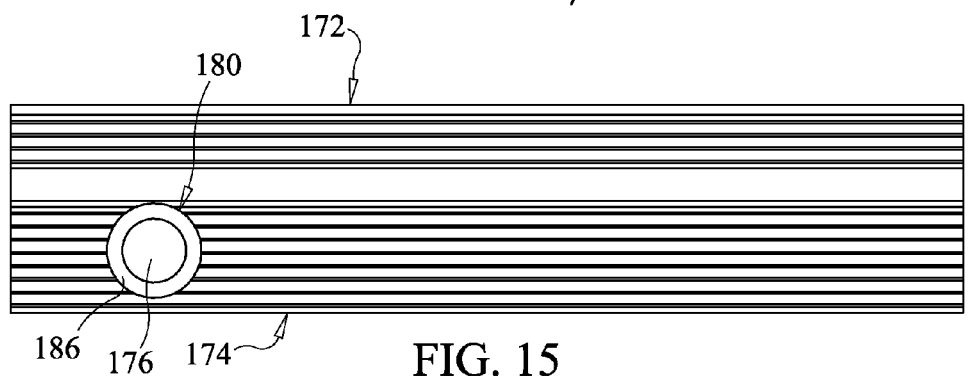
FIG. 15 is a right side view of the sealing jaw of FIG. 13.
Figure 16:
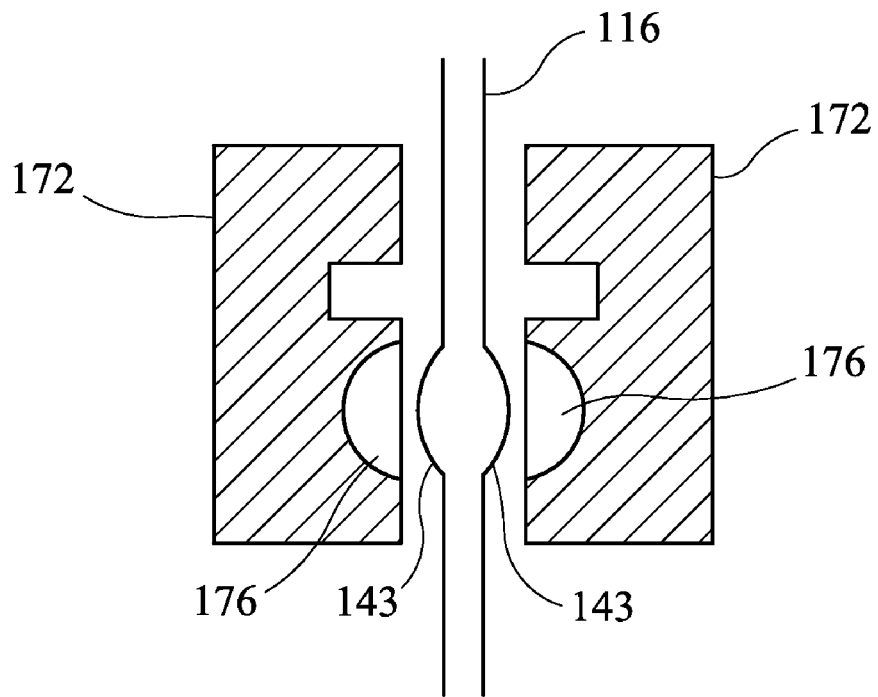
FIG. 16 is a side view of the cross-sealing device of FIG. 3, showing the sealing jaws in an open position.
Figure 17:
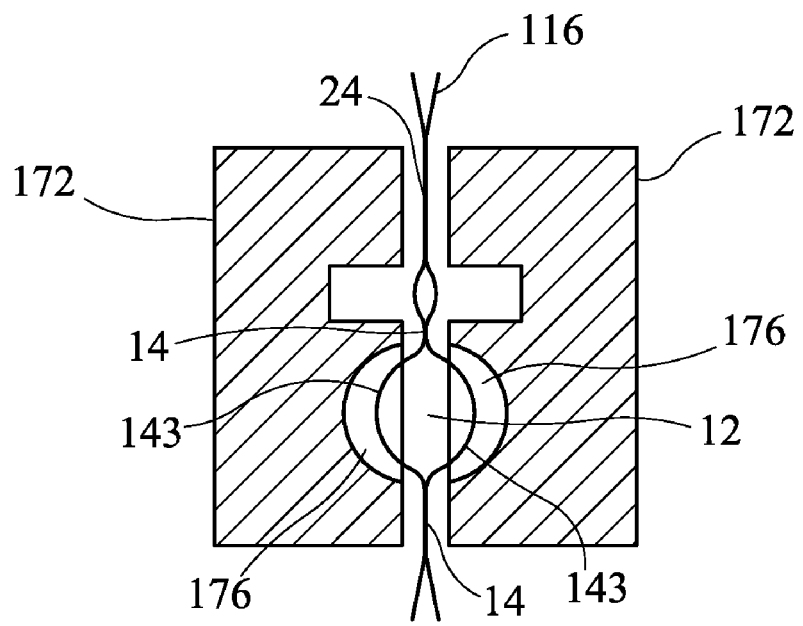
FIG. 17 shows the cross-sealing device of FIG. 16 with the sealing jaws in a closed position.

In typical commercial embodiments, the indentation-forming device 140 further includes a back plate 146 with at least one foil-contacting portion 156 that cooperates with the foil-contacting portions 144 of the punches 142 to form the indentations 143 in the foil web 110 (see FIG. 9). The foil web 110 is routed between the back plate 146 and the punches 142. So when the punches 142 are moved from the retracted position (see FIG. 9) to the extended position (see FIG. 10) relative to the back plate 146, the punches and the back plate cooperatively apply a compression force on the foil web 110. This pressure deforms the foil web 110 to form the indentations 143. The back plate 146 may be made of a metal (e.g., steel) or another material with sufficient hardness for cooperating with the punches 142 to form the indentations 143 in the foil web 110.

In the depicted embodiment, the foil-contacting portions 144 of the punches 142 are "male" protrusions with a hemispherical shape. And the foil-contacting portions 156 of the back plate 146 are "female" recesses with a hemispherical shape. The back-plate recesses 156 receive the punch protrusions 144 to produce dome-shaped indentations 143. In alternative embodiments, the punches have female recessed ends or other foil-contacting portions and the back plate has male protrusions or other foil-contacting portions. In the depicted embodiment, the punches 142 move into engagement with the back plate 146, which is fixed in place. In alternative embodiments, the punches and the back plate move, or only the back plate moves, as long as there is relative movement between the two parts.

The back plate 146 may be made of two (or more) parts that are individually laterally adjustable to multiple positions (to align with individually adjustable-position punches 142) so that the indentations 143 can be formed a different distance from the side edge of the bags 10 when using a different-width foil web 110 to produce different-sized bags. For example, the parts with the foil-contacting portions 156 of the back plate 146 can be individually mounted to the machine 100 by conventional mounting structures such as clamps that couple to rods, bars, or other structural members extending transversely across the machine between frame members of the machine.

In the depicted embodiment for forming bags with one bubble 12, the back plate 146 has two foil-contacting recesses 156 formed in it, with one recess for each punch 142. The foil-contacting recesses 156 are positioned to align with and receive the foil-contacting protrusions 144 of the punches 142 in them when the punches are moved to the extended position. In an alternative embodiment for forming bags with two bubbles, the indentation-forming device has four recesses formed in it (e.g., for receiving four punches) that form four indentations so that, when the foil web is formed into the foil tube, two of the indentations are aligned directly facing the other two indentations. The indentation-forming device may include one recess for each punch, one laterally moveable recessed part and multiple fixed punches, one laterally moveable punch and multiple fixed recessed parts, or the like. Movable recessed parts may move laterally between multiple positions along a transverse guide track with the movement controlled by conventional automatic controls. In addition, the recesses may be provided on a single back plate or on multiple back plates, for example, with each back plate having a recess.

Figure 7:
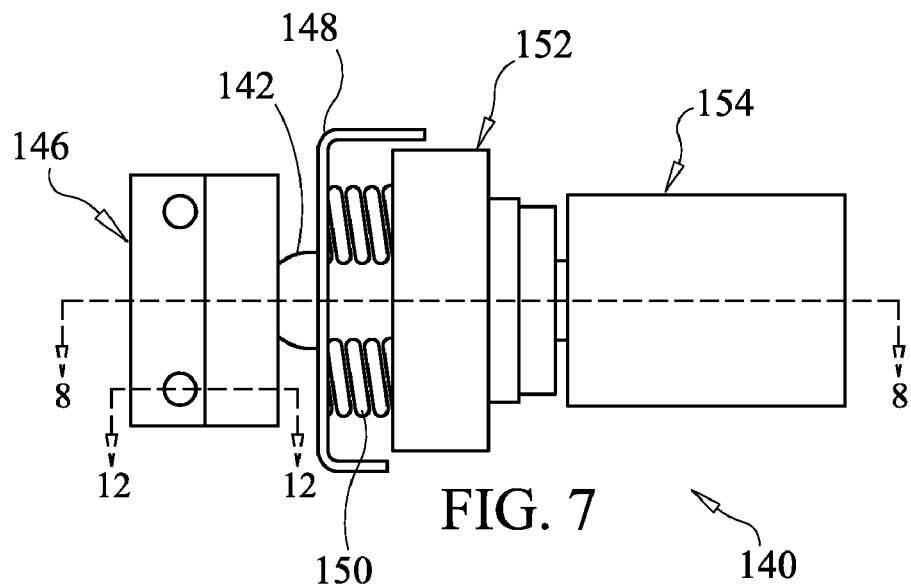
FIG. 7 is a right side view of the indentation-forming device of FIG. 4.
Figure 8:
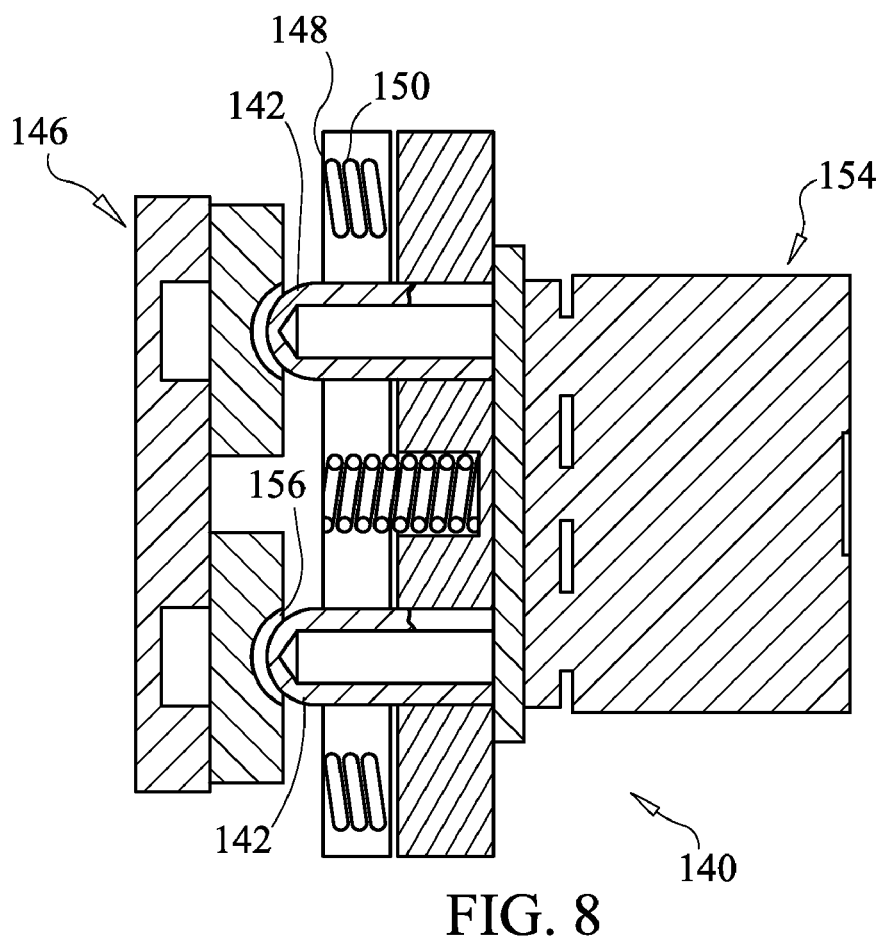
FIG. 8 is a cross-sectional view taken at line 8-8 of the indentation-forming device of FIG. 7.

Furthermore, the depicted indentation-forming device 140 includes a press plate 148, at least one spring element 150, a base 152, and an actuator 154 (see FIGS. 7-9). The press plate 148 has openings 158 in it, with one opening for each punch 142. The openings 158 are sized, shaped, and positioned to receive the punches 142 (or at least the foil-contacting ends 144) through them. The press plate 148 has a generally flat contact surface 160 that contacts the foil web 110 and holds it in place against a generally flat contact surface 162 of the back plate 142. The spring elements 150 are mounted between the press plate 148 and the base 152 and bias the press plate away from the base. The spring elements 150 may be provided by six helical coil compression springs, as shown, or by more or fewer spring elements of the same or another conventional type. The punches 142 are mounted to the base 152 and aligned with the openings 158 and the foil-contacting recesses 156. The punches 142 and the press plate 148 move together under force delivered by the actuator 154. The actuator 154 may be provided by a pneumatic cylinder with inlet and outlet ports for connecting to air hoses that are routed to a valve that is connected to an air compressor that is typically mounted onboard the machine 100. In other embodiments, the actuator is provided by a different-type cylinder (e.g., hydraulic or screw), an electric motor, a solenoid, or another conventional actuating device. In the depicted embodiment, there is one actuator 154 driving one base 152 to which both punches 142 are mounted, though in other embodiments each punch is mounted to its own base and driven by its own actuator.

When the base 152 is moved laterally (as indicated by the directional arrow in FIG. 10) from the retracted position (see FIG. 9) to the extended position (see FIG. 10), the press plate 148 comes into contact with the foil web 110 and presses it against the back plate 146. (For convenience, the springs 150 are not shown in FIGS. 9 and 10.) As the base 152 is moved further laterally, the press plate 148 is stopped from further movement by the back plate 146. So the spring element 150 compresses as the punch 142 continues moving laterally through the opening 158, into contact with the foil web 110, into the recess 156 to deform the foil web 110 and form the indentation 143, and to the extended position. With the foil web 110 held between the back plate 146 and the press plate 148, all (or substantially all) of the deformation in the foil is in the immediate area of the indentation, so the rest of the foil is not deformed and remains suitable for forming a good seal to create the bubble 12. When the base 152 is moved (e.g., by the spring elements 150, the actuator 154, or both) laterally back to the retracted position, the press plate 148 and punch 142 disengage from the foil web 110, leaving the indentations 143 formed in the foil.

In an alternative embodiment, the back plate has apertures (instead of recesses) extending all the way through it for receiving the punches without providing a back wall for cooperatively forming the indentations, which instead are formed by the punches and the rim of the apertures. In another alternative embodiment, the indentation-forming device is provided without the press plate and spring elements. And in yet another alternative embodiment, the back plate is made of two components at least one of which is laterally moveable to form different recess spacings and the base is made of two components at least one of which is laterally moveable to form different punch spacings conforming to the recess spacings.

In addition, the punches 142 and the back plate 146 may be heated so that the indentations 143 retain their shape well. In the depicted embodiment, for example, the punches 142 and the back plate 146 each have bores 164 and 166, respectively, formed in them. The bores 164 and 166 are sized and shaped to receive heating elements 168 and 170, respectively, of a generally conforming size and shape. In a typical commercial embodiment, the heating elements 168 and 170 are provided by electric-resistance heating rods with electric wiring that is routed to the electric panel of the machine 100. The punches 142 and the back plate 146 are made of a conductive material that transfers heat from the heating elements 168 and 170 to the foil web 110. The heating elements 168 and 170 are selected with a heating capacity such that the foil web 110 is warmed enough to retain the indentation shape but not so much that the foil loses its strength and the bubble 12 formed by the indentations 143 would fail prematurely. For example, in typical commercial embodiments the punches 142 and the back plate 146 are made of aluminum and the heating elements 168 and 170 are provided by 500 watt electric resistance heating rods. Typically, there are one or two heating elements 168 for each punch 142 and one or two heating elements 170 for each back plate 146, though more heating elements (and bores) may be provided if desired.

Referring additionally to FIGS. 13-20, the cross-sealing device 130 includes two opposing sealing jaws 172 (see also FIG. 3) each having an inward-facing contact surface 174. The contact surfaces 174 each have a blank 176 formed in them. The blanks 176 are voids (e.g., recesses or through-holes) that are sized, shaped, and positioned to receive the indentations 143 in them after the foil web 110 is formed into the foil tube 118 with the two indentations aligned. Thus, the jaws 172 are positioned with the blanks 176 directly opposite from and aligned with each other. In this way, the jaws 172 move from an open position (see FIG. 16) to a closed position (see FIG. 17) where they cooperate to form a portion of the foil tube 118 into the top transverse seal zone 14. The aligned indentations 143 are not sealed together because they are received in the blanks 176, thereby trapping air between them and forming a bubble 12 in the seal zone. The blanks 176 may be positioned vertically off-center and closer to the top of the contact surfaces 174. In this way, the air bubble 12 is formed closer to the top edge 20 of the top transverse seal zone 14 so the top portion of the seal zone fails first when the bubble is compressed, as shown in FIG. 2.

The contact surfaces 174 of the jaws 172 may be configured in any of several different ways. In the depicted embodiment, the contact surface 174 of each jaw 172 is divided into first and second sections 174a and 174b with a gap 178 between them. The first contact surfaces 174a cooperate to form the bottom seal zones 24 and the second contact surfaces 174b cooperate to form the top seal zones 14 of the bags 10. The separating device 138 (e.g., knife blade) is positioned in the gap 178 and moves transversely to separate the tubular bag 10 (formed by the top and bottom seals 14 and 24) from the foil tube 116. The blanks 176 are located on the second contact surfaces 174b to form the indentations 143 in the top seal zones 14. In an alternative embodiment, the first and second contact surfaces are formed on separate jaws, with two opposing upper jaws and two opposing lower jaws.

The blanks 176 of the jaws 172 may be configured in any of several different ways. In the depicted embodiment, the blanks 176 are defined by bushings 180 that are received in bores 182 formed perpendicularly into the contact surfaces 174, as shown in FIGS. 18 and 19. Each bushing 180 is secured in its corresponding bore 182 by mating threads or other conventional fastening structures. In this way, by rotating the bushings 180, the depth of the blanks 176 can be adjusted with respect to the contact surfaces 174 to maintain precise sealing and bubble-forming even with variations in the plastic film material, wear of the components, etc. In an alternative embodiment, the blanks are integrally formed recesses in the contact surfaces. In another alternative embodiment, the blanks are defined in removable (e.g., snap-in) bushings provided in different radial sizes for forming bubbles from different-sized indentations. And in yet another alternative embodiment, the contact surfaces have multiple blanks formed in them and are provided with blank covers that can be placed over the blanks to provide sealing contact surfaces, with only one of the blanks left uncovered at a time for forming the bubble at a particular location of the bags.

In addition, the bushings 180 may each include a collar 184 peripherally arranged about the blank 176, with the collar defining a peripheral (e.g., annular) contact surface 186. The collar contact surfaces 186 of the bushings 180 compress between them the foil tube 118 at the periphery of the indentations 143. In this way, the collar contact surfaces 186 form a peripheral (e.g., annular) seal 26 (see FIG. 1) about the bubble 12 that prevents lateral air leakage through the seal zone 14 when the bubble is compressed.

The jaws 172 may be serrated with channels 188 formed in the jaw contact surfaces 174. In typical commercial embodiments, the collars 184 are positioned with the collar contact surfaces 186 transversely inset to between the depths of the channels 188 and the jaw contact surfaces 174. With the collar contact surfaces 186 inset from the jaw contact surfaces 174, the peripheral seal 26 is generally weaker and fails under less pressure relative to the rest of the seal zone 14. For example, positioning the collars 184 with the collar contact surfaces 186 located at about one-half of the depth of the channels 188 produces generally good results. In other words, if the channel 188 depth relative to the jaw contact surface 174 is "x," then the collar contact surface 186 depth is about "x/2," as shown in FIG. 20. In other embodiments the collars 184 are positioned so that the collar contact surfaces 186 are not inset or are inset by a different distance.

In addition, the jaws 172 may be heated for welding the foil tube 118 to form good seals in the seal zones 14 and 24. Each of the jaws 172 may be heated by at least one heating element received in at least one bore defined in that jaw. In the depicted embodiment, for example, the jaws 172 each have three bores 190a-c (collectively "the bores 190") formed in them for receiving three heating elements 192a-c (collectively "the heating elements 192"). The heating elements 192 may be provided by, for example, electric-resistance heating rods with electric wiring that is routed to the electric panel of the machine 100. Thus, the heating elements 192 may be of the same type as those provided for the indentation-forming device 140 described herein. The jaws 172 are made of a conductive material that transfers heat from the heating elements 192 to the foil tube 118. The heating elements 192 are selected with a heating capacity such that the foil tube 118 is warmed enough to form a good seal in the seal zones 14 and 24 but not so much that the foil loses its strength and would fail prematurely. For example, in typical commercial embodiments the jaws 172 are made of aluminum and the heating elements 192 are provided by 500 watt electric resistance heating rods.

In conventional tubular bagging machines, each cross-sealing jaw has two heating elements of the same higher heating capacity for forming a strong seal. In the depicted embodiment, however, each of the jaws 172 has at least three heating elements 192a-c. The first contact surface 174a is heated by a heating element 192a with a higher heat capacity for forming a strong seal in the bottom seal zone 24. Similarly, a lower portion or zone of the second contact surface 174b is heated by a heating element 192c with a higher heat capacity for forming a strong seal in a lower portion (inwardly from, i.e., below the bubble 12) of the top seal zone 14. However, an upper portion or zone (outwardly from, i.e., above the bubble 12) of the second contact surface 174b is heated by a heating element 192b with a relatively lower heat capacity for forming not as strong a seal (relative to the seals formed by the other two heating elements). So when the bubble 12 is compressed and the top seal zone 14 fails, the failure zone 18 is between the bubble and the top edge 20 of the bag 10, where the seal was weakest. In alternative embodiments, the jaws include more or fewer heating elements in more or fewer bores.

In addition, the jaws 172 may include an internal insulating zone 194 between the heating elements 192b and 192c of the second contact surface 174b. In the depicted embodiment, for example, the insulating zone 194 is provided by an air-filled elongated opening that is adjacent the second contact surface 174b, is between the second and third heating elements 192b and 192c, and extends along all or substantially all of the transverse length of the jaws 172. In alternative embodiments, the jaws are provided with other types of insulating zones such as an opening filled with an insulating material or fluid, an opening that extends all the way through the length of the jaw with a blower that forces air through the opening, or cooling coils routed through the jaws for carrying a refrigerant. In another alternative embodiment, each jaw is divided into two sections with a space between the upper and lower sections of the second contact surface of each jaw, with the space serving as the insulating zone.

The machine 100 further includes controls for operating the indentation-forming device 140 and the modified cross-sealing device 130. Conventional tubular bagging machines include a programmed logic controller that is programmed for operating the foil-moving device to advance the foil through the machine at a desired speed, pause the foil-moving device and operate the sealing jaws during the pause, advance the foil further through the machine, and so on. In the depicted embodiment, the machine 100 includes such a PLC provided with additional programming for additionally operating the indentation-forming device 140. Preferably, the PLC is programmed to activate the actuator 154 during the time when the foil-moving device 118 has paused the foil tube 116 and operated the cross-sealing device 130 to form the transverse seals and separate the sealed tube into a bag 10. So the machine 100 does not need to pause the foil advancement to operate the indentation-forming device 140 at a separate time from when it pauses for operating the cross-sealing device 130. The controls may also include a temperature sensing and control device (e.g., a thermostat) for automatically controlling the heat delivered by the heating elements 168, 170, and 192. In alternative embodiments, the speed and pausing of the foil-moving device, the actuation of the indentation-forming device, and the actuation of the modified cross-sealing device, are controlled by other conventional control systems such as transistor-based control circuits or mechanical control systems. Persons of ordinary skill in the art understand the design, configuration, and operation of these conventional control system components.

FIG. 21 shows a bushing 280 of a cross-sealing device according to another example embodiment of the present invention. The bushing 280 has a collar 284 and a collar contact surface 286 peripherally surrounding the blank 276, similar to in the embodiment described above. In this embodiment, however, the collar contact surface 286 has a first segment 286a that is wider (e.g., radially) than a second segment 286b. The narrower second segment 286b is outwardly positioned, that is, adjacent or closer to an edge of the jaw contact surface than the wider first segment 286a. In the depicted embodiment, for example, the narrower second segment 286b is positioned adjacent the top of the second jaw contact surface (i.e., adjacent the gap between the first and second jaw contact surfaces). As shown in FIG. 22, the resulting seal zone 214 has a peripheral seal 226 with a first segment 226a and a second segment 226b that is narrower than the first segment. In this way, the narrower second segment 226b fails first (before the wider first segment 226a) when the bubble 212 in the seal zone 214 of the bag 210 is compressed.

FIG. 23 shows a sealing jaw 372 of a cross-sealing device according to another example embodiment of the present invention. The jaw 372 has a contact surface 374 with a blank 376 in it, similar to in the embodiments described above. In this embodiment, however, the jaw contact surface 374 has a directional channel 396 positioned between the blank 376 and the gap 378 in the jaw 372. In a typical commercial embodiment, the directional channel 396 is about as wide as or wider than the blank 376 and is tapered outwardly (e.g., upwardly), though the channel may be provided in other sizes and shapes. And the directional channel 396 may be at least as deeply inset into the jaw contact surface 374 as the serration channels. Because the directional channels 396 are transversely inset from the jaw contact surfaces 374, when the jaws 372 are pressed together no seal is formed in the foil tube between the directional channels. As shown in FIG. 24, the directional channels cooperatively produce an unsealed air-directing area 398 in the seal zone 314 of the bag 310 so that the only seal that needs to be broken when compressing the bubble 312 is the peripheral seal 326.

In other alternative embodiments, the blanks, punches, and recesses are sized and shaped to form the indentations and bubbles in other shapes and sizes. For example, these components can be oval-shaped for producing oval-shaped indentations and bubbles. The oval-shaped bubble can be oriented vertically in the seal zone so that when the lower portion of the oval bubble is compressed the air is forced into the upper portion of the oval bubble, which will then tend to burst upward through the seal zone. Or the oval bubble can be oriented horizontally in the seal zone so that it takes up less area and the seal zone can be made smaller to save film. As another example, these components can be configured for producing two adjacent bubbles so that, when they are compressed, to the extent the seal zone fails laterally (and not all outwardly/upwardly), they burst together to cooperatively form one failure zone. As yet another example, these components can be configured for producing bubbles that are semi-circular, with the flat segment closer to the top of the seal zone so the seal zone fails in that direction first. And in yet another alternative embodiment, the jaw contact surface has a portion with serrated channels that are angled or vertically arranged to direct the air outward/upward when the bubble is compressed.

In another aspect, the present invention includes a method of manufacturing pop-to-open bags as described herein. The method includes the steps of feeding foil web to a tubular bagging machine, deforming the foil at two places to form two indentations in the foil, forming the foil into a tube with the two indentations aligned with each other, sealing the tube with sealing jaws to form a transverse seal zone with the aligned indentations cooperatively defining an air bubble in the transverse seal zone, and separating sealed sections of the tube into bags. The method can be carried out by using a tubular packaging machine such as any of those described herein or by using other functionally similar machines. When using the machine described herein, the step of deforming the foil web at two places to form two indentations is performed by an indentation-forming device with two foil-deforming punches. When using other machines, this step may be performed for example by an indentation-forming device that uses a vacuum to apply suction to deform the foil web to form the indentations. And the step of sealing the foil tube and forming the bubble is performed by a cross-sealing device with two opposing sealing jaws with blanks in them for receiving the aligned indentations. When using other machines, the indentation may be formed after the foil web is reshaped into the foil tube, for example, by the indentation-forming device and the cross-sealing device sharing common components. Such embodiments may include a central base with two lateral recesses that are positionable within the foil tube and two outer punches (without any sealing contact surfaces) that are positionable outside the foil tube and that cooperate with the central base recesses to form the indentations. The same central base is used with two outer jaws that are positionable outside the foil tube, that have recesses that cooperate with the central base recesses to form the aligned indentations into a bubble, and that have sealing contact surfaces for cooperating with sealing contact surfaces of the central base to form the top seal. In addition, the method can of course be carried out to form seal zones with more bubbles in them if desired for a given application.

In yet another aspect, the present invention includes a retrofit kit for installing onto a conventional tubular packaging machine. The retrofit kit includes an indentation-forming device and a cross-sealing device such as those described herein. The indentation-forming device is retrofitted onto the conventional machine at the front end (before the foil web is formed into the foil tube) and the cross-sealing device is retrofitted onto the machine at the back end (after the foil web is formed into the foil tube) by conventional mounting structures such as clamps that couple to rods, bars, or other elements of the machine. In addition, the retrofit kit may include the mounting hardware for mounting the indentation-forming device and the cross-sealing device to the machine, and control lines (electrical wiring, pneumatic hoses, etc.) for operably connecting these devices to the appropriate parts of the machine (electrical panel, air compressor, etc.)

It should be noted that throughout this application the terms "top" and "bottom" and the like are used to denote the relative positions of the seal zones of typical bags. These terms are not meant to be limiting, however, as the invention described herein can be adapted for use in machines that make bags that open at a bottom or side seal zone.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A machine that makes foil web into pop-to-open bags for containing articles, comprising:
    an indentation-forming device including at least one punch that moves from a retracted position to an extended position to form at least two indentations in the foil web, wherein in the retracted position the punch does not contact and deform the foil and in the extended position the punch contacts and deforms the foil to form the indentations;
    a forming shoulder that reshapes the foil web into a foil tube with the two indentations aligned;
    a cross-sealing device including two opposing sealing jaws each having an inward-facing contact surface with a blank positioned therein, wherein the blanks are aligned to receive the aligned indentations therein, the jaw contact surfaces cooperate to form a portion of the foil tube into a seal zone with the aligned indentations forming a bubble within the seal zone, the bubble containing a fluid, and the seal zone at least partially defines a newly made one of the pop-to-open bags; and
    a separating device that separates the newly made pop-to-open bag from the foil tube, wherein each of the pop-to-open bags has an interior space containing the article, the interior space is a separate element from the bubble when the pop-to-open bag is unopened, and under application of a compressive force the bubble bursts by a resulting pressure of the fluid in the bubble creating in the seal zone a failure zone through which the fluid is expelled to thereby expose free edges of the pop-to-open bag that can be gripped and pulled to open the pop-to-open bag.

2. The bag-making machine of claim 1, wherein the indentation-forming device includes at least one back plate that cooperates with the punch to form the indentations.

3. The bag-making machine of claim 2, wherein the back plate includes two recesses that receive the punch therein to form the indentations in the foil web.

4. The bag-making machine of claim 2, wherein the punch and the back plate each include at least one heating element for heating the foil web to form the indentations.

5. The bag-making machine of claim 1, wherein the blanks are positioned off-center and closer to a top of the contact surface than a bottom of the contact surface so that the bubble is formed closer to a top edge of the top transverse seal zone than a bottom edge of the transverse seal zone.

6. The bag-making machine of claim 1, further comprising:
    a longitudinal sealing device that seals edges of the foil web to create a longitudinal seal in the foil tube;
    a foil-moving device that transports the foil through the machine; and
    a vertically aligned fill pipe for receiving and filling the foil tube.

7. A machine that makes foil web into pop-to-open bags, comprising:
    an indentation-forming device including at least one punch that moves from a retracted position to an extended position to form at least two indentations in the foil web, wherein in the retracted position the punch does not contact and deform the foil and in the extended position the punch contacts and deforms the foil to form the indentations;
    a forming shoulder that reshapes the foil web into a foil tube with the two indentations aligned;
    a cross-sealing device including two opposing sealing jaws each having an inward-facing contact surface with a blank positioned therein, wherein the blanks are aligned to receive the aligned indentations therein, the jaw contact surfaces cooperate to form a portion of the foil tube into a seal zone with the aligned indentations forming a bubble within the seal zone, and the seal zone at least partially defines a newly made one of the pop-to-open bags;
    a press plate and at least one spring element, wherein the press plate has at least one opening through which the punch extends and a contact surface that holds the foil web in place against the back plate when the punch forms the indentations, and the spring element biases the press plate toward the back plate; and
    a separating device that separates the newly made pop-to-open bag from the foil tube.

8. The bag-making machine of claim 7, wherein the sealing jaws each include at least one collar defining a peripheral contact surface surrounding the blank, wherein the collar peripheral contact surfaces cooperatively form a peripheral seal zone surrounding the bubble in the bag.

9. The bag-making machine of claim 7, further comprising:
    a longitudinal sealing device that seals edges of the foil web to create a longitudinal seal in the foil tube;
    a foil-moving device that transports the foil through the machine; and
    a vertically aligned fill pipe for receiving and filling the foil tube.

10. A machine that makes foil web into pop-to-open bags, comprising:
    an indentation-forming device including at least one punch that moves from a retracted position to an extended position to form at least two indentations in the foil web, wherein in the retracted position the punch does not contact and deform the foil and in the extended position the punch contacts and deforms the foil to form the indentations;
    a forming shoulder that reshapes the foil web into a foil tube with the two indentations aligned;
    a cross-sealing device including two opposing sealing jaws each having an inward-facing contact surface with a blank positioned therein, wherein the blanks are aligned to receive the aligned indentations therein, the jaw contact surfaces cooperate to form a portion of the foil tube into a seal zone with the aligned indentations forming a bubble within the seal zone, and the seal zone at least partially defines a newly made one of the pop-to-open bags, and wherein the blanks of the sealing jaws are formed by axially adjustable bushings received in bores perpendicularly formed in the jaw contact surfaces; and a separating device that separates the newly made pop-to-open bag from the foil tube.

11. The bag-making machine of claim 10, wherein the sealing jaws each include at least three heating elements, wherein the first contact surface section is heated by a first one of the heating elements to form a strong seal in the bag bottom seal zone, a lower portion of the second contact surface section is heated by a second one of the heating elements to form a strong seal in a lower portion of the bag top seal zone, and an upper portion of the second contact surface section is heated by a third one of the heating elements to form relatively not as strong a seal in an upper portion of the bag top seal zone, wherein when the bubble is compressed the top seal zone fails at a failure zone that is between the bubble and a top edge of the bag in the weaker upper portion of the top seal zone.

12. The bag-making machine of claim 11, wherein the sealing jaws each include at least one insulating zone interposed between the second and third heating elements for the second jaw contact surface section.

13. The bag-making machine of claim 10, further comprising:
   a longitudinal sealing device that seals edges of the foil web to create a longitudinal seal in the foil tube;
   a foil-moving device that transports the foil through the machine; and
   a vertically aligned fill pipe for receiving and filling the foil tube.

14. A machine that makes foil web into pop-to-open bags, comprising:
   an indentation-forming device including at least one punch that moves from a retracted position to an extended position to form at least two indentations in the foil web, wherein in the retracted position the punch does not contact and deform the foil and in the extended position the punch contacts and deforms the foil to form the indentations;
   a forming shoulder that reshapes the foil web into a foil tube with the two indentations aligned;
   a cross-sealing device including two opposing sealing jaws each having an inward-facing contact surface with a blank positioned therein, wherein the blanks are aligned to receive the aligned indentations therein, the jaw contact surfaces cooperate to form a portion of the foil tube into a seal zone with the aligned indentations forming a bubble within the seal zone, and the seal zone at least partially defines a newly made one of the pop-to-open bags, and wherein the sealing jaws each include at least two heating elements that produce a relatively lower-heat zone and a relatively higher-heat zone on the jaw contact surfaces; and
   a separating device that separates the newly made pop-to-open bag from the foil tube.

15. The bag-making machine of claim 14, wherein the sealing jaws each include at least one collar defining a peripheral contact surface surrounding the blank, wherein the collar peripheral contact surfaces cooperatively form a peripheral seal zone surrounding the bubble in the bag.

16. The bag-making machine of claim 14, further comprising:
   a longitudinal sealing device that seals edges of the foil web to create a longitudinal seal in the foil tube;
   a foil-moving device that transports the foil through the machine; and
   a vertically aligned fill pipe for receiving and filling the foil tube.

17. A machine that makes foil web into pop-to-open bags, comprising:
   an indentation-forming device including at least one punch that moves from a retracted position to an extended position to form at least two indentations in the foil web, wherein in the retracted position the punch does not contact and deform the foil and in the extended position the punch contacts and deforms the foil to form the indentations;
   a forming shoulder that reshapes the foil web into a foil tube with the two indentations aligned;
   a cross-sealing device including two opposing sealing laws each having an inward-facing contact surface with a blank positioned therein, wherein the blanks are aligned to receive the aligned indentations therein, the jaw contact surfaces cooperate to form a portion of the foil tube into a seal zone with the aligned indentations forming a bubble within the seal zone, and the seal zone at least partially defines a newly made one of the pop-to-open bags, wherein the jaw contact surfaces are divided into first and second sections with a gap therebetween and with the blanks formed in the second sections, wherein the first jaw contact surface sections cooperate to form bottom seal zones of the bags and the second jaw contact surface sections cooperate to form the bubble-containing seal zones as top seal zones; and
   a separating device that separates the newly made pop-to-open bag from the foil tube.

18. The bag-making machine of claim 17, wherein the sealing jaws each include at least one collar defining a peripheral contact surface surrounding the blank, wherein the collar peripheral contact surfaces cooperatively form a peripheral seal zone surrounding the bubble in the bag.

19. The bag-making machine of claim 17, further comprising:
   a longitudinal sealing device that seals edges of the foil web to create a longitudinal seal in the foil tube;
   a foil-moving device that transports the foil through the machine; and
   a vertically aligned fill pipe for receiving and filling the foil tube.

20. A machine that makes foil web into pop-to-open bags, comprising:
   an indentation-forming device including at least one punch that moves from a retracted position to an extended position to form at least two indentations in the foil web, wherein in the retracted position the punch does not contact and deform the foil and in the extended position the punch contacts and deforms the foil to form the indentations;
   a forming shoulder that reshapes the foil web into a foil tube with the two indentations aligned;
   a cross-sealing device including two opposing sealing jaws each having an inward-facing contact surface with a blank positioned therein, wherein the blanks are aligned to receive the aligned indentations therein, the jaw contact surfaces cooperate to form a portion of the foil tube into a seal zone with the aligned indentations forming a bubble within the seal zone, and the seal zone at least partially defines a newly made one of the pop-to-open bags, and wherein the sealing jaws each include at least one collar defining a peripheral contact surface surrounding the blank, wherein the collar peripheral contact surfaces cooperatively form a peripheral seal zone surrounding the bubble in the bag; and
   a separating device that separates the newly made pop-to-open bag from the foil tube.

21. The bag-making machine of claim 20, wherein the jaws are serrated with channels defined therein, and the collar peripheral contact surface is transversely inset to between the jaw contact surface and depths of the channels.

22. The bag-making machine of claim 20, wherein the collar peripheral contact surface has a first segment and a second segment that is narrower than the first segment so that the peripheral seal of the bag has a first segment and a second segment that is narrower than the first segment.

23. The bag-making machine of claim 20, wherein the jaw contact surface has an directional channel transversely inset therefrom and, positioned adjacent the blank so that when the jaws are pressed together no seal is formed in the foil tube between the directional channels, wherein the directional channels cooperatively form an unsealed air-directing area in the seal zone of the bag so that the only seal that needs to be broken when compressing the bubble is the peripheral seal.

* * * * *